United States Patent
Ganesan et al.

(10) Patent No.: US 9,077,832 B2
(45) Date of Patent: Jul. 7, 2015

(54) CONTENT RETRIEVAL VIA ASSIGNMENTS

(75) Inventors: Kumaravel Ganesan, Chinnalapatti (IN); Ritesh Ranjan Jha, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 89 days.

(21) Appl. No.: 13/249,791

(22) Filed: Sep. 30, 2011

(65) Prior Publication Data

US 2013/0083350 A1 Apr. 4, 2013

(51) Int. Cl.
*G06F 3/12* (2006.01)
*H04N 1/00* (2006.01)
*H04N 1/21* (2006.01)

(52) U.S. Cl.
CPC .......... *H04N 1/00429* (2013.01); *G06F 3/1204* (2013.01); *G06F 3/1271* (2013.01); *G06F 3/1285* (2013.01); *H04N 1/00244* (2013.01); *H04N 1/00464* (2013.01); *H04N 1/00474* (2013.01); *H04N 1/2187* (2013.01); *H04N 1/2191* (2013.01); *H04N 2201/0039* (2013.01)

(58) Field of Classification Search
CPC ... G06F 3/1204; G06F 3/1271; G06F 3/1285; H04N 1/00244; H04N 1/00429; H04N 1/00464; H04N 1/00474; H04N 1/2187; H04N 1/2191; H04N 2201/0039
USPC ................... 358/1.1–1.18, 1.1–1.9, 1.11–1.18
See application file for complete search history.

(56) References Cited

U.S. PATENT DOCUMENTS

| | | | | |
|---|---|---|---|---|
| 5,469,533 A | * | 11/1995 | Dennis | 358/1.15 |
| 6,009,410 A | * | 12/1999 | LeMole et al. | 705/14.54 |
| 6,184,996 B1 | * | 2/2001 | Gase | 358/1.15 |
| 7,573,604 B2 | | 8/2009 | Hull et al. | |
| 7,970,781 B1 | * | 6/2011 | King et al. | 707/759 |
| 2004/0066531 A1 | * | 4/2004 | Kim | 358/1.15 |
| 2004/0205493 A1 | * | 10/2004 | Simpson et al. | 715/501.1 |
| 2005/0273445 A1 | | 12/2005 | Steelberg et al. | |
| 2007/0027932 A1 | | 2/2007 | Thibeault | |
| 2007/0264985 A1 | | 11/2007 | Kapur et al. | |
| 2008/0086511 A1 | * | 4/2008 | Takao et al. | 707/104.1 |
| 2008/0282198 A1 | | 11/2008 | Brooks et al. | |
| 2009/0086239 A1 | * | 4/2009 | Selvaraj | 358/1.13 |
| 2009/0241135 A1 | | 9/2009 | Wong et al. | |
| 2009/0287674 A1 | | 11/2009 | Bouillet et al. | |

(Continued)

OTHER PUBLICATIONS

Hewlett-Packard Development Company, L.P., "App Developers Private Beta," ePrintCenter, Apr. 16, 2010, <http://web.archive.org/web/20100416210403/http://h30495.www3.hp.comidevelopers?>.
Hewlett-Packard Development Company, L.P., "Help and Tips," Hp ePrintCenter, Aug. 28. 2011, <http://web.archive.org/web/20110528234332/http://h30495.www3.hp,com/help>.

(Continued)

*Primary Examiner* — King Poon
*Assistant Examiner* — Ibrahim Siddo
(74) *Attorney, Agent, or Firm* — Hewlett-Packard Patent Department (57) ABSTRACT

In one embodiment, a first assignment is received. The first assignment is an assignment of a category tag to first content accessible via a first printer application. A second assignment is received. The second assignment is an assignment of the category tag to second content accessible via a second printer application. The first and second assignments are stored. Functionality to facilitate retrieval of content via the assignments is provided to a network-connected printer. A request to print selected content from among the first and second content is received. Responsive to the request, the selected content is retrieved, raster processed, and sent to the printer.

24 Claims, 9 Drawing Sheets

(56) References Cited

U.S. PATENT DOCUMENTS

| | | |
|---|---|---|
| 2009/0323118 A1 | 12/2009 | Kil |
| 2010/0174974 A1 | 7/2010 | Brisebois et al. |
| 2010/0225955 A1 | 9/2010 | Almen et al. |
| 2010/0309512 A1 | 12/2010 | Onoda |
| 2011/0113090 A1 | 5/2011 | Peeri |
| 2011/0145908 A1* | 6/2011 | Ting .................. 726/7 |
| 2011/0276805 A1 | 11/2011 | Nagpal et al. |
| 2011/0310431 A1 | 12/2011 | Uchikawa |
| 2012/0159356 A1 | 6/2012 | Steelberg |
| 2012/0300249 A1* | 11/2012 | Shustef et al. ............... 358/1.15 |
| 2013/0021638 A1 | 1/2013 | Hong et al. |

OTHER PUBLICATIONS

Joe Brockmeier, "Alfresco: Content Management for Small Business," Feb. 9, 2011, <http:// www.smallbusinesscomputing.com/biztools/article.php/3924136/Alfresco-Content-Management-for-Small-Business.htm>.

Wikipedia, "Alfresco (software)," Aug. 10, 2011, <http://en.wikipedia.org/w/index.php?title=Alfresco_software)&oldid=444040780>.

Wikipedia, "Bookmark (World Wide Web)," Jul. 5, 2011, <http://en.wikipedia.org/w/index,php? titie=Bookmark_Worid_Wide_Web)&oldid=437877230>.

* cited by examiner

Associations Database

| Tags | Tagged Content | User Doing Tagging | Private or Public |
|---|---|---|---|
| Kids Coloring Pages | Cinderella Coloring Page Printable 1 | Printer User 1 | Private |
| Kids Coloring Pages | Cinderella Coloring Page Printable 2 | Printer User 1 | Private |
| Kids Coloring Pages | Cinderella Coloring Page Printable 3 | Printer User 1 | Private |
| Kids Coloring Pages | Robots Coloring Page Printable 1 | Printer User 1 | Private |
| Kids Coloring Pages | Robots Coloring Page Printable 2 | Printer User 1 | Private |
| Kids Coloring Pages | Robots Coloring Page Printable 3 | Printer User 1 | Private |
| Games | Snow White crossword puzzle | Printer User 2 | Public |
| Games | Zoo Animals hidden pictures | Printer User 3 | Public |
| Games | Dinosaurs riddles | Printer User 4 | Public |

CONTENT RETRIEVAL VIA ASSIGNMENTS

BACKGROUND

Certain network-connected printers are capable of sending and receiving communications and printable content via a network without being connected to a desktop computer, laptop computer, or other host computing device. Such functionality can provide considerable flexibility and efficiencies for a user, as the user may have the ability to download and print content at the printer without the complication of first establishing a connection with a host.

BRIEF DESCRIPTION OF THE DRAWINGS

The accompanying drawings illustrate various embodiments and are a part of the specification. The illustrated embodiments are examples and do not limit the scope of the claims. Throughout the drawings, identical reference numbers designate similar, but not necessarily identical elements.

The same part numbers designate the same or similar parts throughout the figures.

DETAILED DESCRIPTION OF EMBODIMENTS

Some network-connected printers provide a user with the option of downloading and running, or accessing at the printer, software applications that allow a user to retrieve, and print, desired content from computing devices external to the web-enabled printer (a "printer application"). By interacting with a particular printer application via the printer's user interface, a printer user may browse and print the desired content hosted by particular web service. Examples of content that may be retrieved utilizing a printer application include news content, coupons, coloring pages for children, puzzles, maps, and greeting cards.

However, utilizing currently available systems a printer user may find it necessary to interact with multiple printer applications to download and print similar content from multiple content providers. For example, a printer user that desires to download and print kids coloring pages available at three distinct content providers may be required to browse, download, and print content utilizing three separate printer applications, with each application being specific to a particular content provider. Users may perceive accessing multiple printer applications to retrieve similar content as a repetitive and/or uninteresting operation, leading to reduced usage of the printer applications at network-connected printers.

Accordingly, various embodiments described herein were developed to receive assignments of category tags to content hosted by multiple content providers, and to provide to internet-connected printers personalized printer application functionality to retrieve selected content for printing via the assignments. It should be noted that while the disclosure is discussed frequently with reference to internet-connected printers, the teachings of the present disclosure are not so limited and can be applied to any network-connected printer. According to embodiments described herein, a computer system receives an assignment of a category tag to first content available at a network-connected printer through a printer application. The computer system also receives an assignment of that category tag to second content available at the printer through a different printer application. The computer system stores the first and second assignments, and provides to the printer functionality to facilitate retrieval of content via the content assignments. The computer system receives a request to print selected content from among the first and second content. Responsive to the request, the computer system retrieves the selected content, raster processes the selected content, and sends the selected content to the printer.

As used herein, a "printer application" refers to a software application that, when accessed by a user at a network-connected printer, allows the user to retrieve, and print, desired content from computing devices external to the printer. A "network-connected printer" refers to a printer that is connected to a network, to be capable of obtaining content, sending and receiving messages, accessing network content, and/or accessing applications via a network. In examples, the network may be a proprietary network, a secured network, an open network, an intranet, an extranet, an internet or the Internet. "Content" refers to any text, image, or other information that can be received by and stored at computer system for later display, printing or other presentation to a user. "Printer" or "printing device" refers to any electronic device that prints and includes multifunctional electronic devices that perform additional functions such as scanning and/or copying. To "direct" or "direction of" an assignment or request refers to directing, ordering, instructing, guiding, commanding, or initiating the assignment or request.

Figure 1:
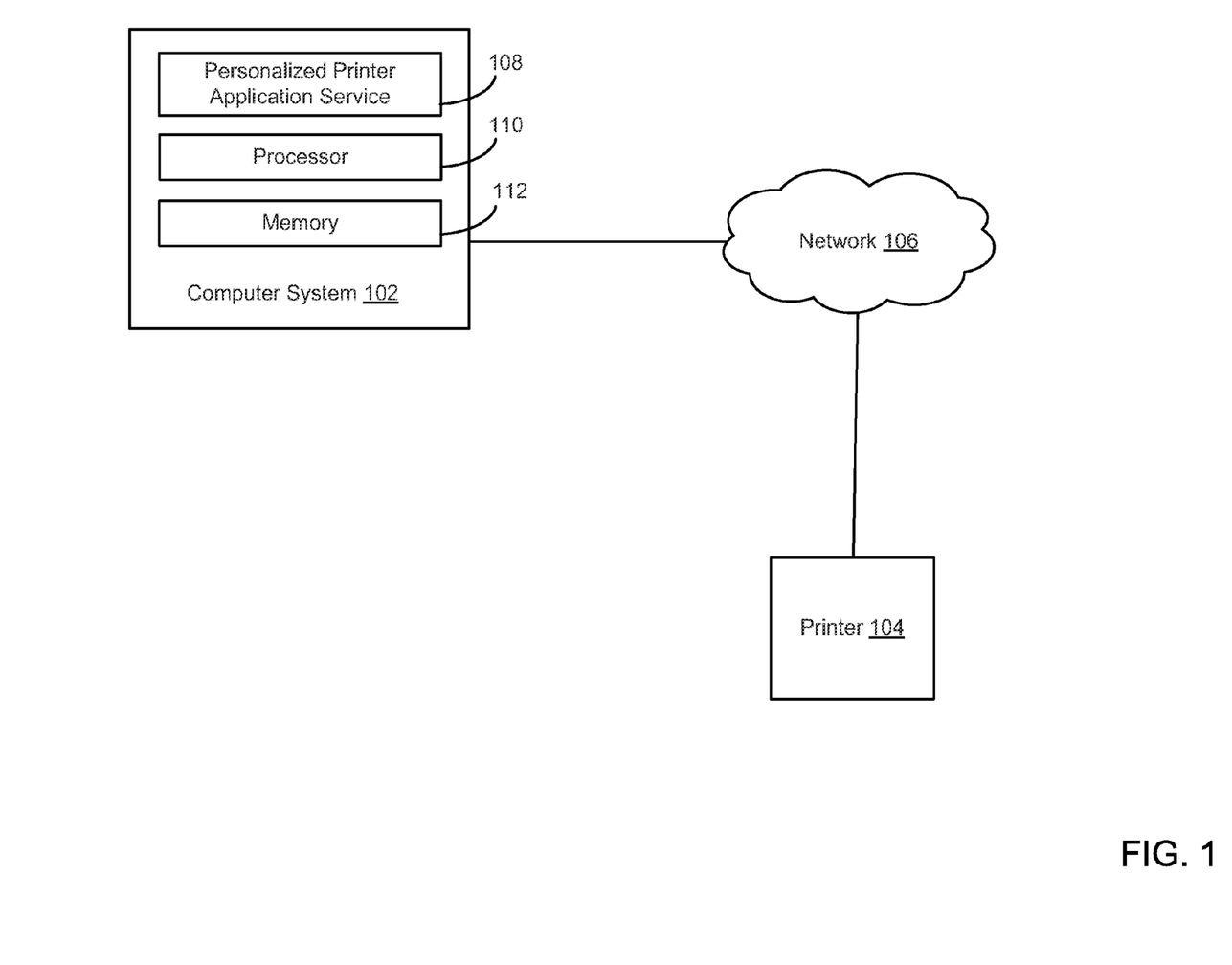
FIG. 1 is a block diagram illustrating a system according to various embodiments.

FIG. 1 is a block diagram illustrating a system according to various embodiments. FIG. 1 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

FIG. 1 shows a computer system 102 and a printer 104 connected to a network 106. Computer system 102 represents generally any computing device or group of computing devices capable of sending network requests and content to, and otherwise communicating with printer 104. Printer 104 represents generally a computing device that is operable to produce printed output and to send and receive communications and content to each other over network 106. In embodiments, computer system 102 may be or include a server, desktop computer, laptop computer, mobile computing device, tablet computer, and/or any other computing device.

Network 106 represents generally hardware components and computers interconnected by communications channels that allow sharing of resources and information. Network 106 may include one or more of a cable, wireless, fiber optic, or remote connection via a telecommunication link, an infrared link, a radio frequency link, or any other connectors or systems that provide electronic communication. Network 106 may include, at least in part, an intranet, the internet, or a combination of both. Network 106 may also include intermediate proxies, routers, switches, load balancers, and the like. The paths followed by network 106 between printer computing device 102 and printer 104 as depicted in FIG. 1 represent the logical communication paths between these devices, not necessarily the physical paths between the devices.

Computing system 102 includes a personalized printer application service 108. Personalized printer application service 108 represents generally any combination of hardware and programming configured to enable assignment of category tags to content hosted by multiple content providers via a network, and to enable downloading for printing selected of selected content via a personalized printer application made available at a network-connected printer. In one example, personalized printer application service 108 receives assignments of a category tag to first and second content. The first content is content accessible at printer 104 via a first printer application executing at printer 104. The second content is content accessible at printer 104 via a second printer application executing at printer 104. In an example, the assignments may be received at service 102 from printer 104, the assignments having been made by a user of printer 104 utilizing a display device and user interface at printer 104. In another example, the assignments may be received at service 102 from a computing device other than printer 104, such as a laptop, desktop or other computing device that is connected to network 106. In the latter example, the assignments are made by a user of the other computing device utilizing a display device and user interface at the other computing device.

The personalized printer application service 108 stores the first and second assignments, and provides to network-connected printer 104 functionality for a personalized printer application to facilitate retrieval of content at printer 104 via the assignments. The service 108 receives a request to print selected content from among the first and second content. Responsive to the request, service 108 retrieves the selected content, raster processes the selected content, and sends the selected content to the printer for printing.

The functions and operations described with respect to computer system 102 may be implemented as a computer-readable storage medium containing instructions executed by a processor (e.g., processor 110) and stored in a memory (e.g., memory 112). In a given implementation, processor 110 may represent multiple processors, and memory 112 may represent multiple memories. Processor 110 represents generally any instruction execution system, such as a computer/processor based system or an ASIC (Application Specific Integrated Circuit), a computer, or other system that can fetch or obtain instructions or logic stored in memory 112 and execute the instructions or logic contained therein. Memory 112 represents generally any memory configured to store program instructions and other data.

Figure 2:
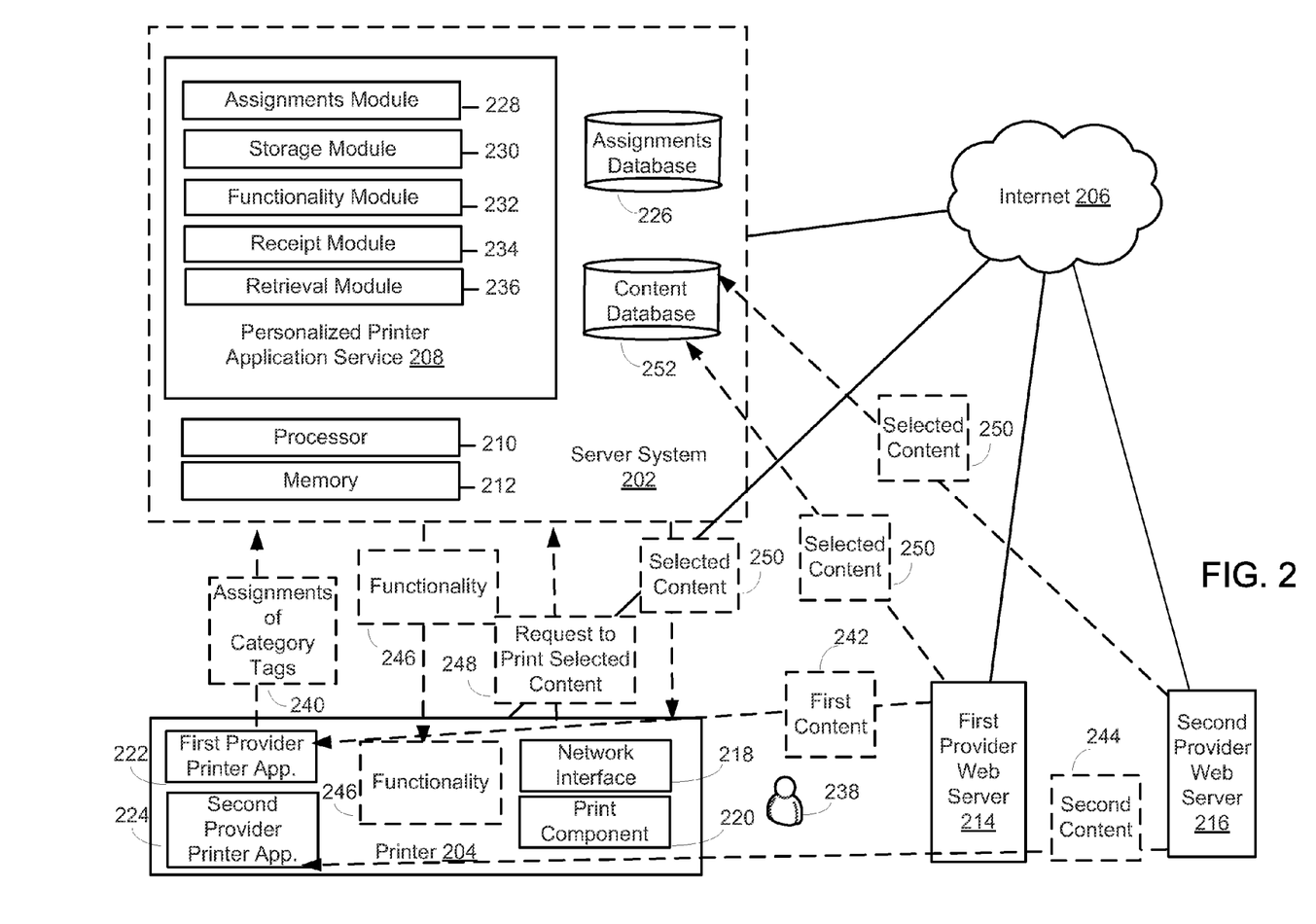
FIG. 2 is a block diagram illustrating a system according to various embodiments.

FIG. 2 is a block diagram that includes a server system 202 according to various embodiments. FIG. 2 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

FIG. 2 shows server system 202, printer 204, first provider web server 214 and second provider web server 216 connected to internet 206. Each of first and second provider web servers represents generally any computing device or group of computing devices capable of sending network requests and content to, and otherwise communicating with server system 202 via internet 206.

Printer 204 is shown to include a network interface 218, a print component 220, a first provider printer application 222, and a second provider printer application 224. Network interface 218 represents generally any combination of hardware and programming configured for electronically connecting printer 204 to internet 206. Print component 220 represents generally any combination of hardware and programming configured to produce printed output. First provider printer application 222 represents generally programming configured to retrieve and print content hosted by first provider web server 214. Second provider printer application 224 represents generally programming configured to retrieve and print content hosted by second provider web server 216.

Server system 202, represents generally any computing device or group of computing devices capable of accepting, processing, storing and outputting data according to programmed instructions. As illustrated in FIG. 2, server system 202 may be a single physical device or it may be distributed among multiple physical devices connected over a network (e.g., the Internet). For example, server system 202 may represent a cloud computing infrastructure (i.e., the cloud). In a cloud computing infrastructure, various components/modules of server system 202 may share resources and/or act in concert even though they might be in different physical locations and/or operating on different physical devices.

Server system 202 is shown to include a personalized printer application service 208, an assignments database 226, and a content database 252. Personalized printer application service 208 represents generally any combination of hardware and programming configured to receive assignments of category tags to content hosted by multiple content providers, and to provide to internet-connected printers personalized printer application functionality to retrieve selected content for printing via the assignments. Personalized printer application service 208 includes an assignments module 228, storage module 230, functionality module 232, receipt module 234, and retrieval module 236. Assignments database 226 represents generally any combination of hardware and programming configured to store printable content retrieved from content repositories such as first provider web server 214 and second provider web server 216 via internet 206. Content database 252 represents generally any combination of hardware and programming configured to store printable content retrieved from content repositories such as first provider web server 214 and second provider web server 216 via internet 206.

In one example, assignments module 228 receives from an internet-connected printer 204, at the direction of a user 238 of the printer, an assignment 240 of a category tag to first content 242. The first content 242 is content hosted by first provider web server 214 and is accessible to printer 204 via first provider printer application 222. Assignments module 228 also receives an assignment of the same category tag to second content 244. The second content 244 is content hosted by second provider web server 216 and is accessible to printer 204 via a second provider printer application 224. In the embodiment shown in FIG. 2, the assignments 240 are received from printer 204, at the direction of user 238 as the user browses and assigns category tags to the first and second content.

Figure 3:
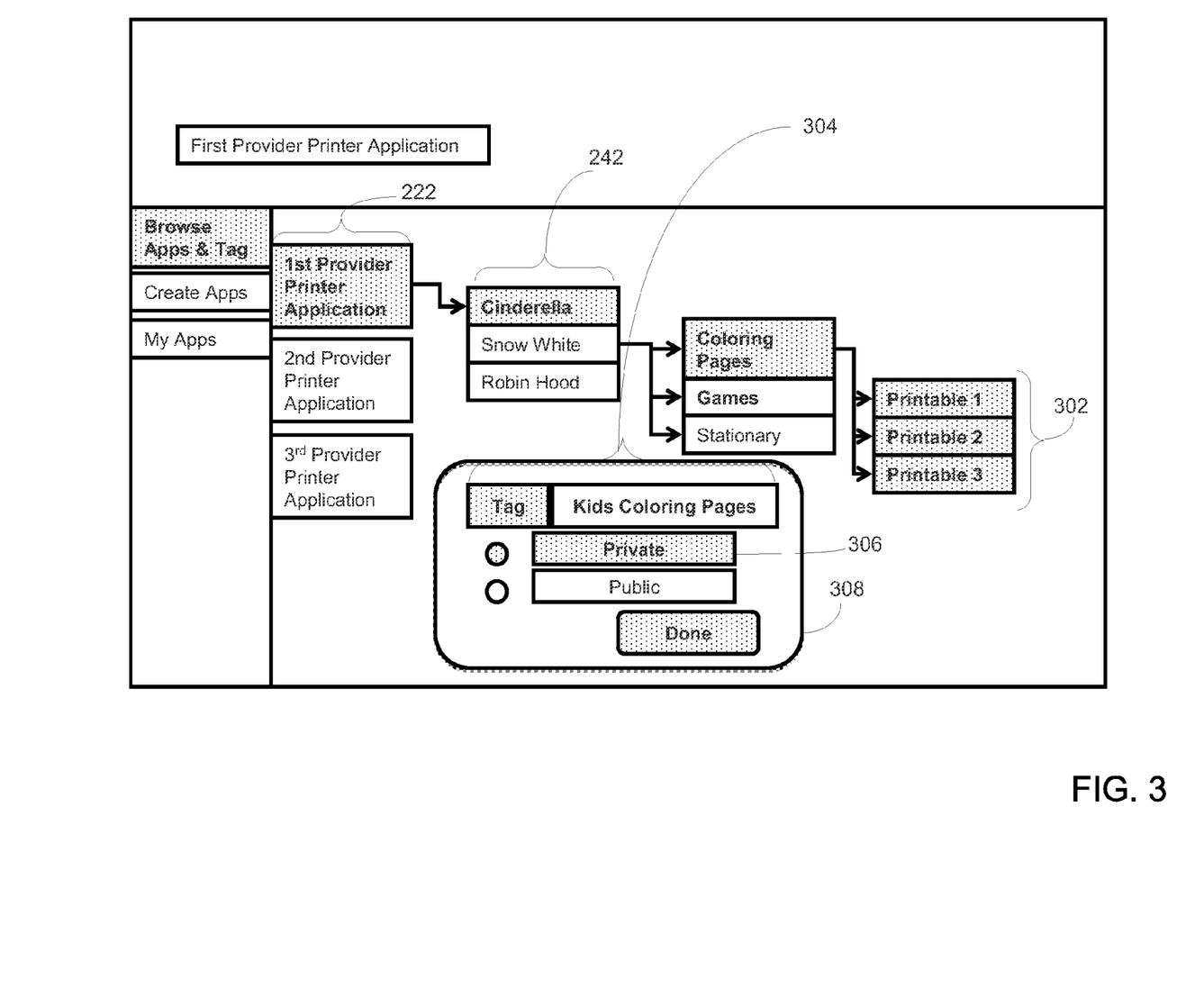
FIGS. 3 and 4 are example displays that may be presented during assignment of category tags to content, according to various embodiments.

User 238 interacts with a touchscreen or other user interface at printer 204 to browse through categories and subcategories of "Cinderella" first content 242 that is available to printer 204 from first provider web server 214 via first provider printer application 222. FIGS. 3 and 4 are example displays that may be presented during to a user at printer 204 during the assignment of category tags to content. Starting with FIG. 3, the user selects, from among the "Cinderella" first content 242 retrieved via the first provider printer application 222, coloring pages printables 1, 2 and 3 as content for tagging 302. A pop-up window 308 appears at the display and user 238 enters a category tag name ("Kids Coloring Pages") to create a category tag 304. The user then directs that the "Kids Coloring Pages" category tag 304 is a private tag 306. By virtue of being a private tag, the Kids Coloring Pages category tag 304 is usable by a defined set of users (e.g., the user that created the tag) or a defined set of printers (e.g., printer 204). In another example, a category tag may be designated as a "public tag" that is visible to and can be used by an expanded set of users (e.g., all users with access to server system 202) or an expanded set of printer (e.g., all printers connected to internet 206). The user directs that the "Kids Coloring Pages" category tag 304 be assigned to content 302 (the Cinderella" coloring page printables 1, 2 and 3).

Figure 4:
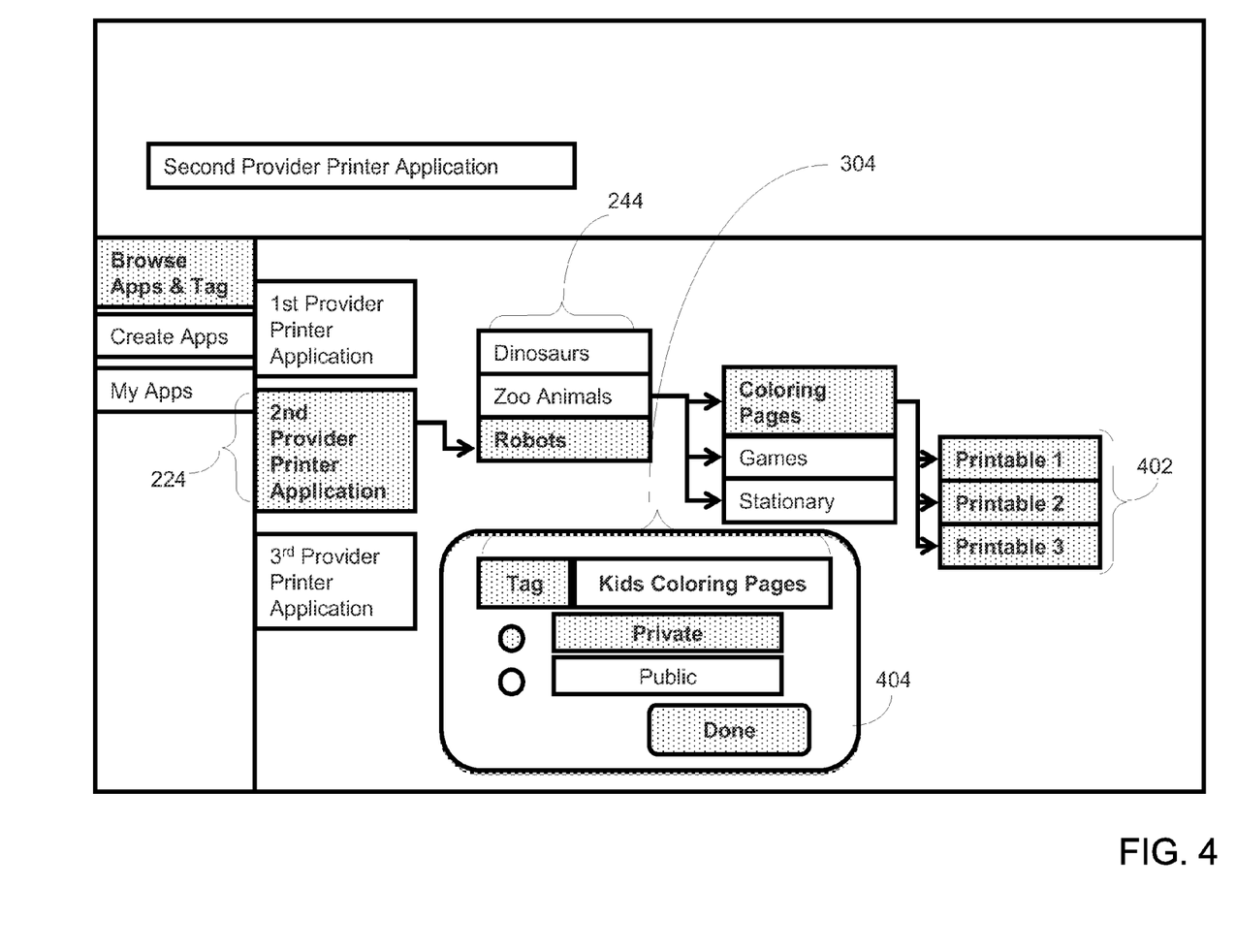

Moving to FIG. 4, the user next browses through categories and subcategories of "Robots" second content 244 that is available to printer 204 from second provider web server 216 via second provider print application 224. In this example, the user selects coloring pages printables 1, 2 and 3 as content for tagging 402. The user selects the already-created "Kids Coloring Pages" category tag 304 via a pop-up window 404, and directs the assignment of tag 304 to the content 402.

Figure 5:
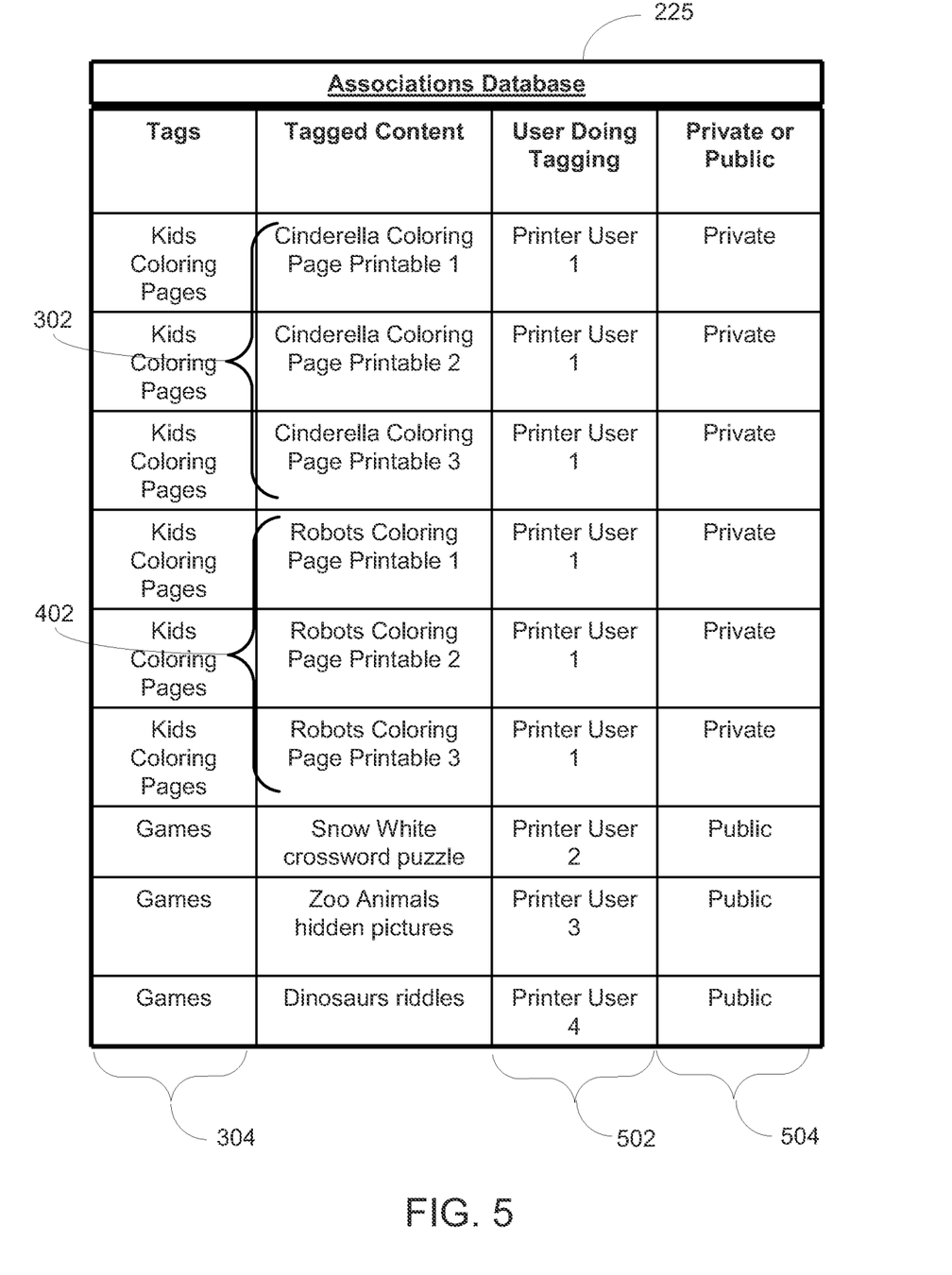
FIG. 5 is an example associations database, according to various embodiments.

Returning to FIG. 2, after the assignments module 228 receives the assignments 240, storage module 230 stores the assignments at an assignments database 226 within server system 202. In other embodiments, the assignments may be stored within a lookup table, data map, or other storage location within, or external to, server system 202. FIG. 5 is an example of an assignments database 226 that may be stored at server system 202. The example database includes, for each incidence of tagged content 302 402, the applicable category tag 304, an identifier 502 for the user that directed the assignment, and whether the tag is a private or public tag 504. In an embodiment, incidences of tagged content 302 402 include a Uniform Resource Locator ("URL") that specifies an address at which the content is available via internet 206.

Figure 6:
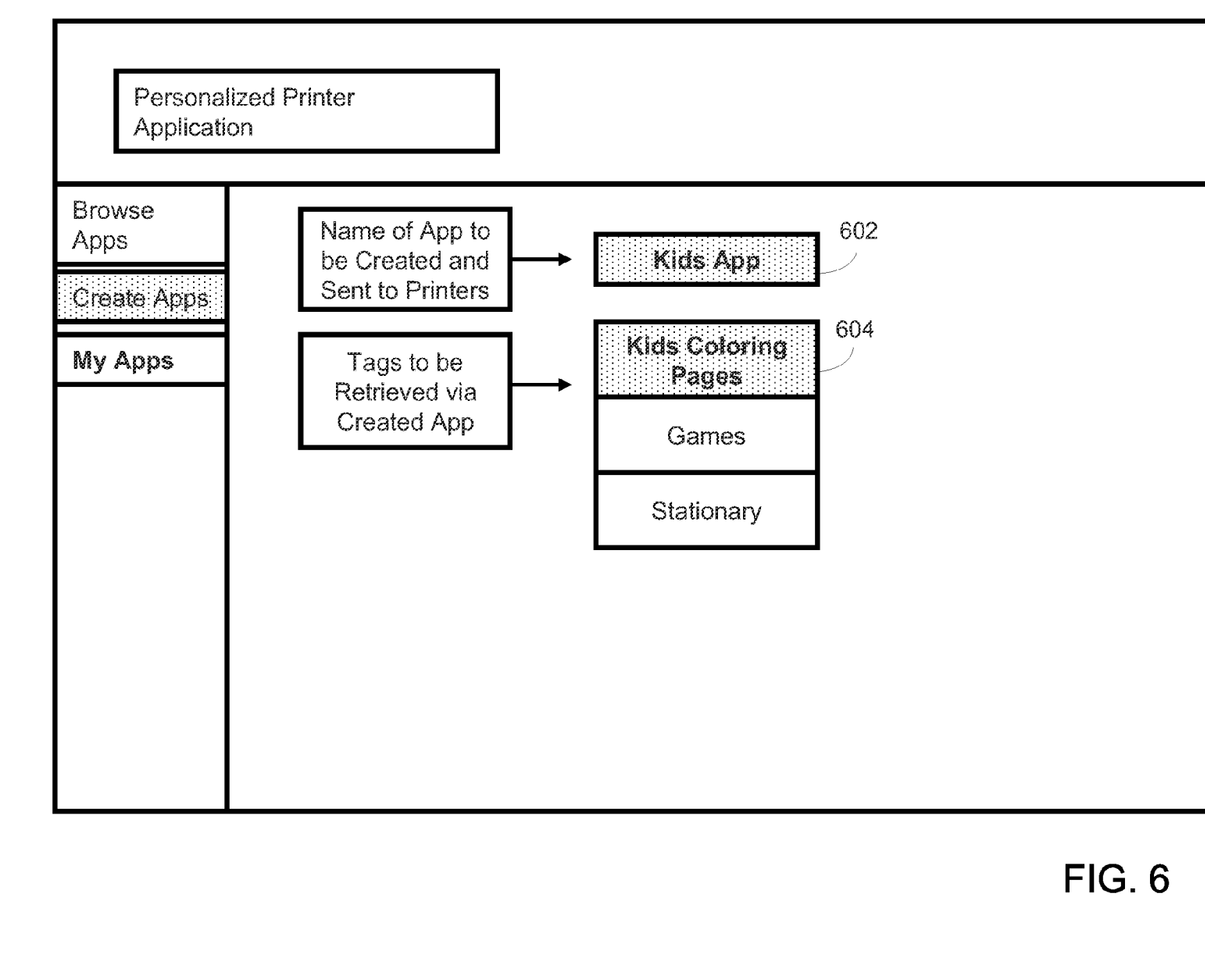
FIG. 6 is an example display that may be presented during providing of functionality to a printer to facilitate retrieval of content via assignments, according to various embodiments.

Returning to FIG. 2, functionality module 232 provides to network-connected printer 204 functionality 246 that facilitates retrieval of content from the first provider web server 214 and the second provider web server 216 via the assignments 240. In embodiments, the functionality may be provided in the form of software, code, computer programming, an application, an executable computer program, an executable application, application interface, and/or graphical user interface. FIG. 6 is an example of a display that may take place during the providing of the functionality by server system 202 to printer 204. In this example, the functionality to be provided is in the form of a personalized printer application that user 238 (FIG. 2) has named "Kids App" 602. The Kids App personalized printer application 602 is configured to retrieve content that has been assigned a "Kids Coloring Pages" 604 category tag. Retrieval of tagged content via the "Kids App" 602 can be more efficient for the user than retrieving the content sequentially via the existing first and second provider printer applications 222 and 224. In this example depicted in FIG. 2, the functionality 246 to be provided is personalized printer application functionality via programming or code to be executed at printer 204. In another example, the functionality to be provided to printer 204 is a user interface or application interface for personalized printer application functionality via programming or code that executes at server system 202.

Figure 7:
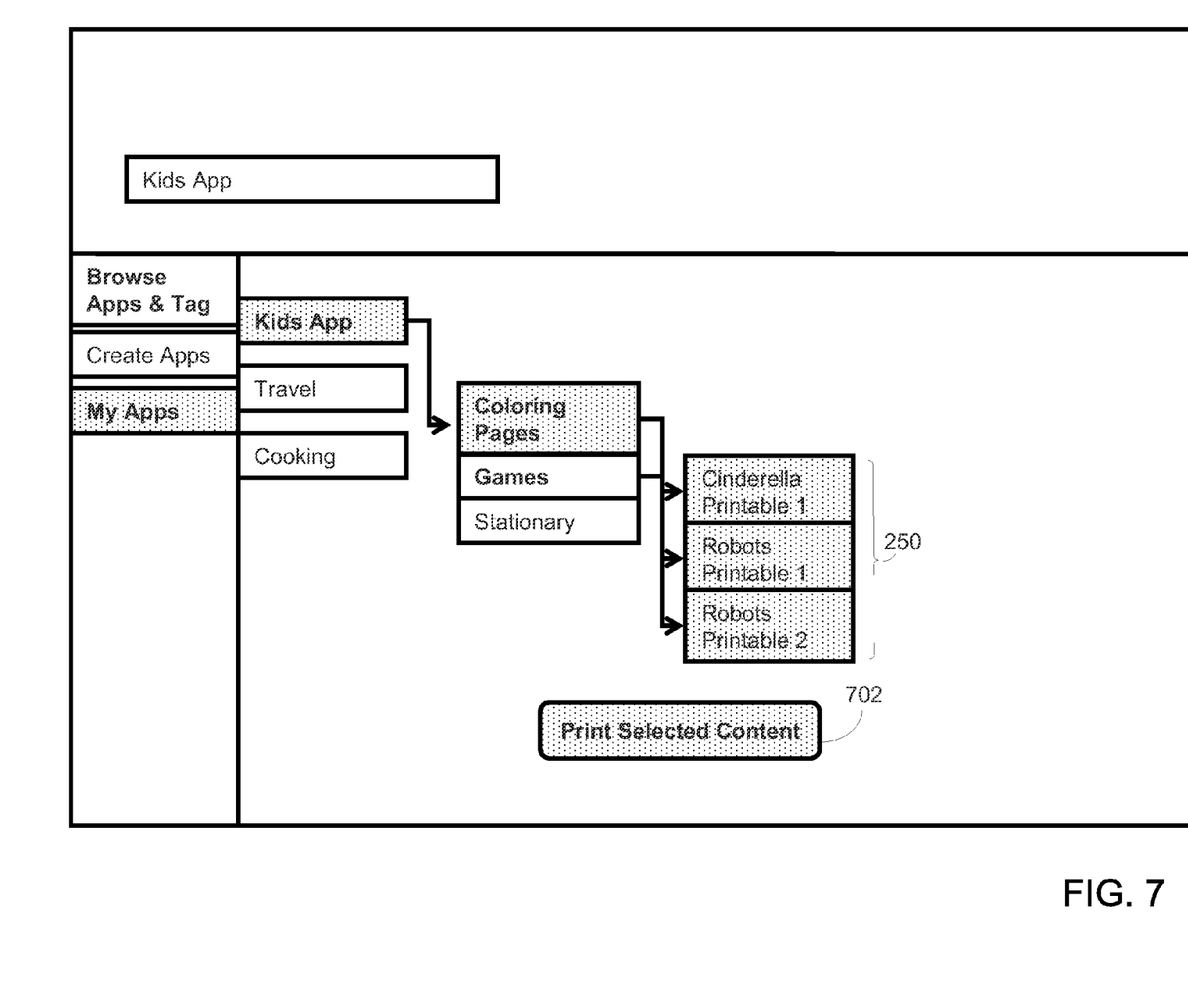
FIG. 7 is an example display that may be presented during sending of a request to print selected content, according to various embodiments.

Returning to FIG. 2, receipt module 234 receives from printer 204, via the functionality 246, a request 248 to print selected content from among the first 242 and second 244 content. FIG. 7 is an example display that may be presented during sending of a request to print selected content, according to various embodiments. In this example, the user 238 (FIG. 2) selects for printing selected content 250 including "Cinderella Printable 1", "Robots Printable 2", and "Robots Printable 3." Upon activation of the "Print Selected Content" button 702, the request to print 248 (FIG. 2) is sent from printer 204 to server 202 (FIG. 2).

Returning to FIG. 2, responsive to receipt of the request 248 for selected content received from printer 204, retrieval module 236 retrieves the selected content 250 from the first provider web server 214 and the second provider web server 216. Retrieved selected content may be stored at content database 252. The retrieval module 236 causes raster processing of the selected content 250, either at server system 202 or at a computing device external to server system 202. In an example, the raster processing includes utilizing vector digital instructions as to how the content is to be printed to create a high resolution raster or bitmap image of the content. The instructions may be expressed in a number of various languages and formats, including but not limited to HPGL/2 (Hewlett-Packard Graphics Language 2), PostScript, PDF (Portable Document Format), JPEG (Joint Photographic Experts Group standard), TIFF (Tagged Image File Format), PCL3 (Printer Command Language 3) and PCL 6 (Printer Command Language 6). In embodiments, the raster processing may apply smoothing or interpolation algorithms to an input bitmap of the content to generate an output bitmap image. Following completion of the raster processing, retrieval module 236 sends the selected content 250 to printer 204 for printing.

The functions and operations described with respect to personalized printer application service 208 and server system 202 may be implemented as a computer-readable storage medium containing instructions executed by a processor (e.g., processor 210) and stored in a memory (e.g., memory 212). In a given implementation, processor 210 may represent multiple processors, and memory 212 may represent multiple memories.

Figure 8:
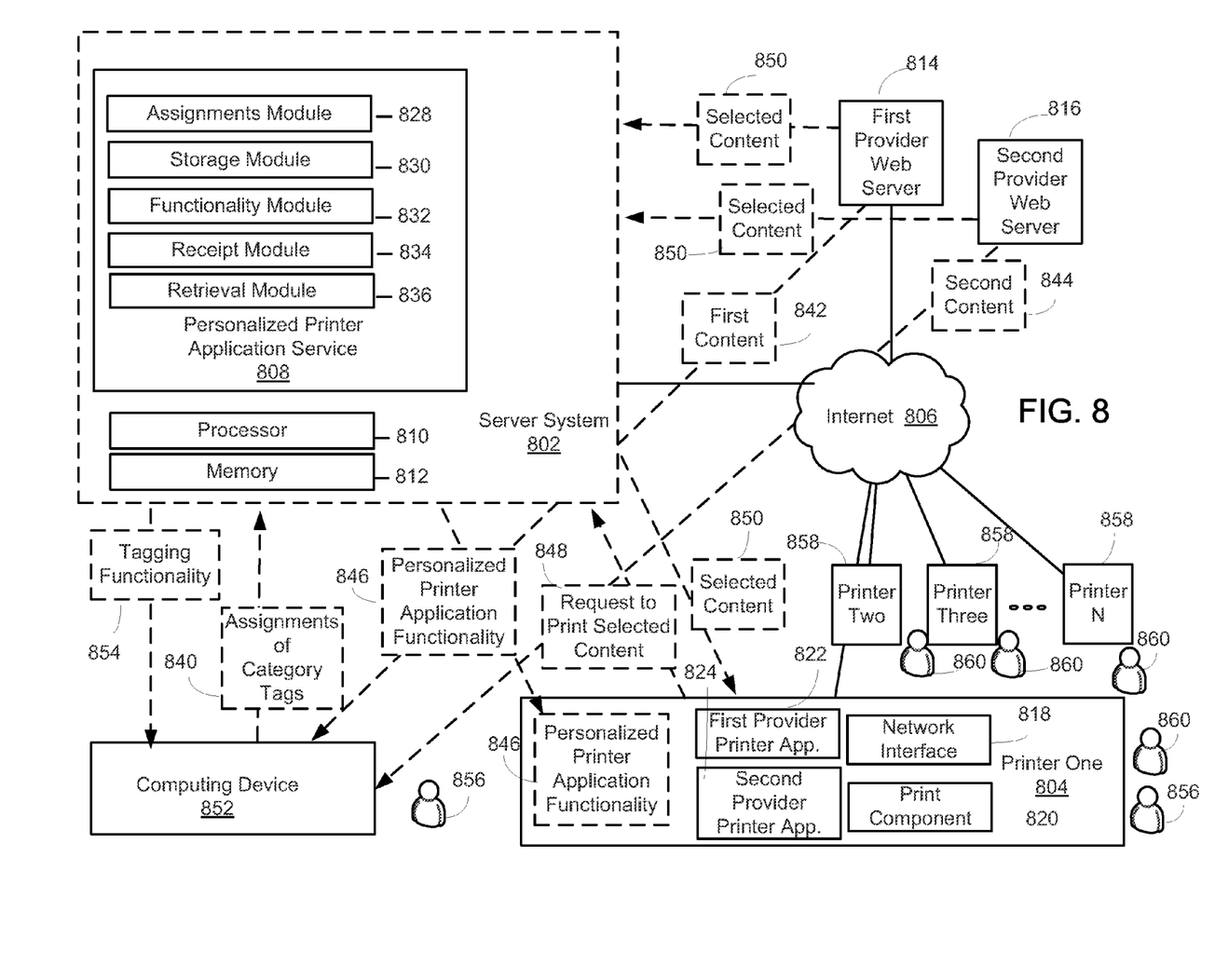
FIG. 8 is a block diagram illustrating a system according to various embodiments.

FIG. 8 is a block diagram that includes a server system 802 according to various embodiments. FIG. 8 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

FIG. 8 shows server system 802, computing device 852, printer 804, first provider web server 814 and second provider web server 816 connected to internet 806. Each of first and second provider web servers represents generally any computing device or group of computing devices capable of sending network requests and content to, and otherwise communicating with server system 802 via internet 806. Computing device 852 represents generally any combination of hardware and programming capable of sending network requests and assignments of category tags to server system 802.

Printer 804 is shown to include a network interface 818, a print component 820, a first provider printer application 822, and a second provider printer application 824. Network interface 818 represents generally any combination of hardware and programming configured for electronically connecting printer 804 to internet 806. Print component 820 represents generally any combination of hardware and programming configured to produce printed output. First provider printer application 822 represents generally programming configured to retrieve and print content hosted by first provider web server 814. Second provider printer application 824 represents generally programming configured to retrieve and print content hosted by second provider web server 816.

Server system 802, represents generally any computing device or group of computing devices capable of accepting, processing, storing and outputting data according to programmed instructions. As illustrated in FIG. 8, server system 802 may be a single physical device or it may be distributed among multiple physical devices connected over a network (e.g., the Internet). For example, server system 802 may represent a cloud computing infrastructure (i.e., the cloud). In a cloud computing infrastructure, various components/modules of server system 802 may share resources and/or act in concert even though they might be in different physical locations and/or operating on different physical devices.

Server system 802 is shown to include a personalized printer application service 808. Personalized printer application service 808 represents generally any combination of hardware and programming configured to receive assignments of category tags to content hosted by multiple content providers, and to provide to internet-connected printers personalized printer application functionality to retrieve selected content for printing via the assignments. Personalized printer application service 808 includes an assignments module 828, storage module 830, functionality module 832, receipt module 834, and retrieval module 836.

In one example, assignments module 828 sends to computing device 852 tagging functionality 854. The tagging functionality 854 is an application, or an interface to an internet application, that enables a user 854 at the computing device 852 to browse printable content hosted by first provider web server 814 and second provider web server 816 to assign category tags. In an example, user 854 may utilize a mouse, keyboard, and/or display device at computing device 852 in connection with the tagging functionality 854 to the browsing and category tag assignment operations.

Next, assignments module 828 receives from computing device 852, via the tagging functionality 854, assignments of category tags to content, including a first assignment of a category tag to first content 842 and a second assignment of the same category tag to second content 844. The first content 842 is content hosted by first provider web server 814 and is accessible to printer 804 via a first provider printer application 822. The second content 844 is content hosted by a second provider web server 816 and is accessible to printer 804 via a second provider printer application 824. The assignments 240 may be received via any networking protocol, including but not limited to Transmission Control Protocol/Internet Protocol ("TCP/IP"), HyperText Transfer Protocol ("HTTP"), Simple Mail Transfer Protocol ("SMTP"), Extensible Messaging and Presence Protocol ("XMPP"), and/or Session Initiation Protocol ("SIP"). In this example, the assignments 840 are directed by a first user 856 at computing device 852.

In an example, computing device 852 also sends to server system 802 an instruction to permit users other than user 856 to access to the first and second assignments 840. In a particular example, the instruction instructs server system 802 to receive and accept requests for access to assignments where the requests are directed by a particular set of users other than user 856. In another example, the instruction instructs server system 802 to receive requests 824 for access to assignments where the requests are directed by any users of specifically identified printers connected to internet 806. In an example, the instructions may be sent at the direction of user 856, and include a listing of other users 860 of printer one 804 or other printers 858 connected to internet 806. In this manner, user 856 shares the results of his/her tagging efforts with the other users 860 that might have common interests.

In an embodiment, the instruction to permit other users to access the assignments 84 includes user names or other identifiers for the users. In an embodiment, the instruction to permit other users 860 to access the assignments 840 may limit the permission to users connected via internet 806. In an example in which internet 806 represents an intranet, the permission may be limited to users of printers connected to the intranet. In another example, the instruction to permit other users 860 to access the assignments 840 may be a general permission granted to any user of specifically-identified printing devices that are connected to the internet 806.

After the assignments module 828 receives the assignments, storage module 830 stores the assignments at a lookup table or other storage location within or external to server system 802.

Functionality module 832 provides to network-connected printer 804 personalized printer application functionality 846 to facilitate retrieval of content from the first provider web server 814 and the second provider web server 816 via the assignments 840. The personalized printer application functionality 846 may be sent via any networking protocol, including but not limited to Transmission Control Protocol/Internet Protocol ("TCP/IP"), HyperText Transfer Protocol ("HTTP"), Simple Mail Transfer Protocol ("SMTP"), Extensible Messaging and Presence Protocol ("XMPP"), and/or Session Initiation Protocol ("SIP").

Receipt module 834 receives from printer 804, via the personalized printer application functionality 846, a request 848 to print selected content from among the first 842 and second 844 content. The request 848 may be received via any networking protocol, including but not limited to Transmission Control Protocol/Internet Protocol ("TCP/IP"), HyperText Transfer Protocol ("HTTP"), Simple Mail Transfer Protocol ("SMTP"), Extensible Messaging and Presence Protocol ("XMPP"), and/or Session Initiation Protocol ("SIP").

In one example, the request 848 is directed by the same user 856 that performed the category tagging at computing device 852. In another example, the request is received from a user 860 other than the first user 856 that made the category tag/content assignments. In an example, server 802 receives an instruction from user 856 at computing device 852 that requests received from other users 860 to access the assignments 840 are to be approved or granted.

Responsive to receipt of the request 848 for selected content received from printer 804, retrieval module 836, retrieves the selected content 850 from the first provider web server 814 and the second provider web server 816. Retrieved selected content may be stored at content database 852. The retrieval module 836 causes raster processing of the selected content 850, either at server system 802 or at a computing device external to server system 802. Following completion of the raster processing, retrieval module 836 sends the selected content 850 to printer 804 for printing. The retrieval of the selected content 850 from the web servers and the sending of the raster processed selected content to printer 804 may be accomplished via any networking protocol, including but not limited to Transmission Control Protocol/Internet Protocol ("TCP/IP"), HyperText Transfer Protocol ("HTTP"), Simple Mail Transfer Protocol ("SMTP"), Extensible Messaging and Presence Protocol ("XMPP"), and/or Session Initiation Protocol ("SIP").

The functions and operations described with respect to personalized printer application service 808 and server system 802 may be implemented as a computer-readable storage medium containing instructions executed by a processor (e.g., processor 810) and stored in a memory (e.g., memory 812). In a given implementation, processor 810 may represent multiple processors, and memory 812 may represent multiple memories.

Figure 9:
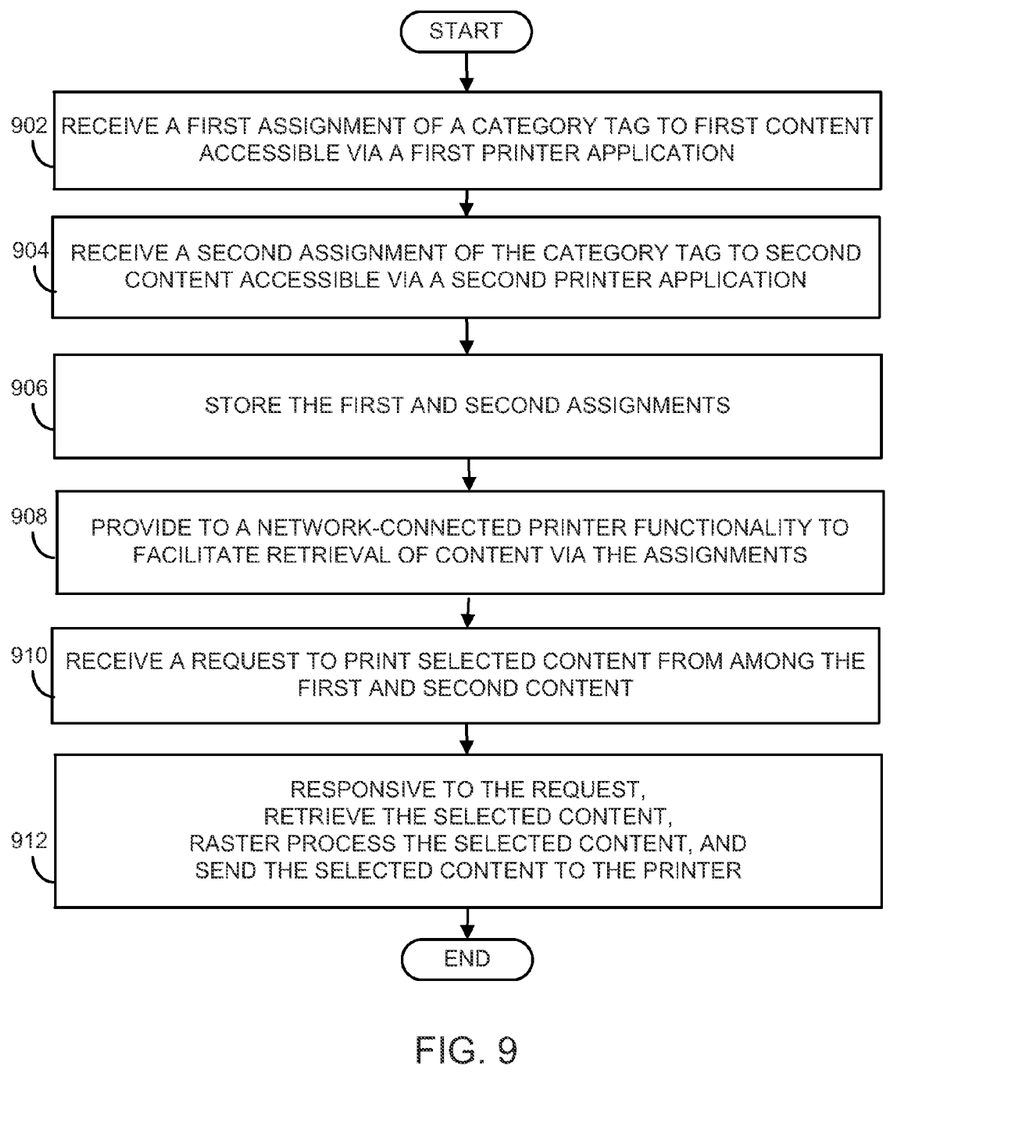
FIG. 9 is a flow diagram depicting steps taken to implement various embodiments.

FIG. 9 is a flow diagram of operation in a system according to various embodiments. In discussing FIG. 9, reference may be made to the diagram of FIGS. 2 and 8 to provide contextual examples. Implementation, however, is not limited to those examples. Starting with FIG. 9, a first assignment of a category tag is received. The first assignment is an assignment of the tag to first content accessible via a first printer application (block 902). Referring back to FIGS. 2 and 8, assignments module 228 or 828 may be responsible for implementing block 902.

Continuing with the flow diagram of FIG. 9, a second assignment of the category tag is received. The second assignment is an assignment of the category tag to second content accessible via a second printer application (block 904). Referring back to FIGS. 2 and 8, assignments module 228 or 828 may be responsible for implementing block 904.

Continuing with the flow diagram of FIG. 9, the first and second assignments are stored (block 906). Referring back to FIGS. 2 and 8, storage module 230 or 830 may be responsible for implementing block 906.

Continuing with the flow diagram of FIG. 9, functionality is sent to a network-connected printer. The functionality facilitates retrieval of content via the assignments (block 908). Referring back to FIGS. 2 and 8, functionality module 232 or 832 may be responsible for implementing block 908.

Continuing with the flow diagram of FIG. 9, a request to print selected content from among the first and second content is received (block 910). Referring back to FIGS. 2 and 8, receipt module 234 or 834 may be responsible for implementing block 910.

Continuing with the flow diagram of FIG. 9, responsive to the request, the selected content is retrieved, raster processed, and sent to the printer (block 912). Referring back to FIGS. 2 and 8, retrieval module 236 or 836 may be responsible for implementing block 912.

Although the flow diagram of FIG. 9 shows specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present disclosure.

Various modifications may be made to the disclosed embodiments and implementations without departing from their scope. Therefore, the illustrations and examples herein should be construed in an illustrative, and not a restrictive, sense.

What is claimed is:

1. A non-transitory computer-readable storage medium containing instructions, the instructions when executed cause a device including a processor to:
receive, at the device, a first assignment by a user of a category tag to first content accessible via a first printer application of a printer communicating with a first server different than the printer and the device and on which the first content is stored, and a second assignment by the user of the category tag to second content accessible via a second printer application of the printer communicating with a second server different than the printer, the device, and the first server and on which the second content is stored;
responsive to receiving the first and second assignments, store, at the device, the first and second assignments;
provide, from the device to the printer, functionality to facilitate retrieval of content via the assignments;
receive, at the device and from the printer via the functionality provided to the printer, a request to print selected content from among the first and second content;
responsive to the request,
retrieve, at the device, the selected content from one or more of the first and second servers,
raster process, at the device, the selected content, and
send, from the device to the printer, the selected content as raster processed for printing at the printer.

2. The medium of claim 1, wherein the functionality is a first functionality, and wherein the instructions further cause the device to send a second functionality to enable assignment of the category tag to content.

3. The medium of claim 1, wherein the first and second assignments are received from the printer based on input by the user.

4. The medium of claim 1, wherein the first and second assignments are received from a computing device other than the printer based on input by the user.

5. The medium of claim 1, wherein the first and second assignments are stored within one of a database and a lookup table.

6. The medium of claim 1, wherein the request is directed by the user.

7. The medium of claim 1, wherein the user is a first user, and the request is directed by a second user.

8. The medium of claim 7, further comprising receiving an instruction directed by the first user to permit the second user to access the first and second assignments.

9. The medium of claim 1, wherein the first assignment and the second assignment are received at the device from a network-connected printer different than the device.

10. The medium of claim 1, wherein the functionality includes program code, wherein providing the functionality comprises sending, from the device to the printer, the program code, and wherein the request is received at the device from the printer using the program code at the printer.

11. The medium of claim 1, wherein receiving the first assignment of the category tag comprises receiving the first assignment of the category tag created by the user in a graphical user interface.

12. The medium of claim 1, wherein the category tag of the first and second assignments indicate that the first content and the second content are part of a same category selected from a plurality of categories presented in a graphical user interface to the user.

13. The medium of claim 1, wherein the first and second assignments are responsive to user selection of the category tag based on a plurality of categories presented in a graphical user interface.

14. A computing device comprising:
an assignments module, configured to receive
  a first assignment by a user of a category tag to first content accessible via a first printer application, and
  a second assignment by the user of the category tag to second content accessible via a second printer application, the first content inaccessible directly via the second printer application, the second content inaccessible directly via the first printer application, the second content different than the first content;
a storage module, configured to store the first and second assignments;
a functionality module, configured to send to a network-connected printer functionality including program code that facilitates retrieval of content via the assignments;
a receipt module, configured to receive a request to print selected content from among the first and second content, the request produced using the program code at the network-connected printer;
a retrieval module, configured, responsive to the request, to:
  retrieve the selected content,
  raster process the selected content, and
  send the raster processed selected content to the printer.

15. The computing device of claim 14, wherein the first and second assignments are received from the printer based on input by the user.

16. The computing device of claim 14, wherein the first and second assignments are received from a computing device other than the printer based on input by the user.

17. The computing device of claim 14, wherein receiving the first assignment of the category tag comprises receiving the first assignment of the category tag created by the user in a graphical user interface.

18. The computing device of claim 14, wherein the category tag of the first and second assignments indicate that the first content and the second content are part of a same category selected from a plurality of categories presented in a graphical user interface to the user.

19. The computing device of claim 14, wherein the first and second assignments are responsive to user selection of the category tag based on a plurality of categories presented in a graphical user interface.

20. A method comprising:
sending a first functionality to enable a first user to assign category tags to content;
receiving, by a computing device, a first assignment by the first user of a category tag to first content accessible via a first printer application, and a second assignment by the first user of the category tag to second content accessible via a second printer application, the first content inaccessible directly via the second printer application, the second content inaccessible directly via the first printer application, the second content different than the first content;
storing, by the computing device, the first and second assignments;
sending, by the computing device, to a network-connected printer a second functionality to facilitate retrieval of content via the assignments;
receiving, by the computing device, via the second functionality at the direction of a second user, a request to print selected content from among the first and second content;
responsive to the request, the computing device;
  retrieving the selected content,
  raster processing the selected content, and
  sending the raster processed selected content to the printer.

21. The method of claim 20, wherein the category tag of the first and second assignments indicate that the first content and the second content are part of a same category selected from a plurality of categories presented in a graphical user interface to the user.

22. The method of claim 20, wherein the first and second assignments are responsive to user selection of the category tag based on a plurality of categories presented in a graphical user interface.

23. the method of claim 20, wherein receiving the first assignment of the category tag comprises receiving the first assignment of the category tag created by the user in a graphical user interface.

24. The method of claim 20, wherein the functionality includes program code, wherein providing the functionality comprises sending, from the system to the printer, the program code, and wherein the request is received at the system from the printer using the program code at the printer.

* * * * *